United States Patent [19]
Lindberg

[11] Patent Number: 5,339,529
[45] Date of Patent: Aug. 23, 1994

[54] MAGNETIC SENSOR MOUNT

[75] Inventor: Kenneth M. Lindberg, Holland, Mich.

[73] Assignee: Prince Corporation, Holland, Mich.

[21] Appl. No.: 989,832

[22] Filed: Dec. 14, 1992

[51] Int. Cl.$^5$ .............................................. G01C 17/28
[52] U.S. Cl. .................................. 33/355 R; 33/359; 33/362; 33/361; 33/333; 248/316.1
[58] Field of Search ................ 33/358, 359, 361, 362, 33/356, 357, 355 R, 347, 1 D, 333; 248/291, 289.1, 316.1

[56] References Cited

U.S. PATENT DOCUMENTS 2,132,168 10/1938 Klein et al. .
2,177,218 10/1939 Klein et al. .
4,425,717 1/1984 Marcus .
4,505,054 3/1985 Clark et al. .
4,953,305 9/1990 Van Lente et al. .

FOREIGN PATENT DOCUMENTS 0087890 9/1983 European Pat. Off. ............. 33/361

Primary Examiner—William A. Cuchlinski, Jr.
Assistant Examiner—Alvin Wirthlin
Attorney, Agent, or Firm—Price, Heneveld, Cooper, DeWitt & Litton

[57] ABSTRACT

A magnetic sensor mounting assembly embodying the present invention includes a base plate having cradles for pivotally receiving and adjustably locking a sensor supporting platform thereto. The base plate can be attached to an existing rearview mirror mounting member. The assembly further includes a cover providing access for adjusting the platform to a horizontal position and for allowing the rearview mirror mounting stem to extend therethrough.

23 Claims, 2 Drawing Sheets

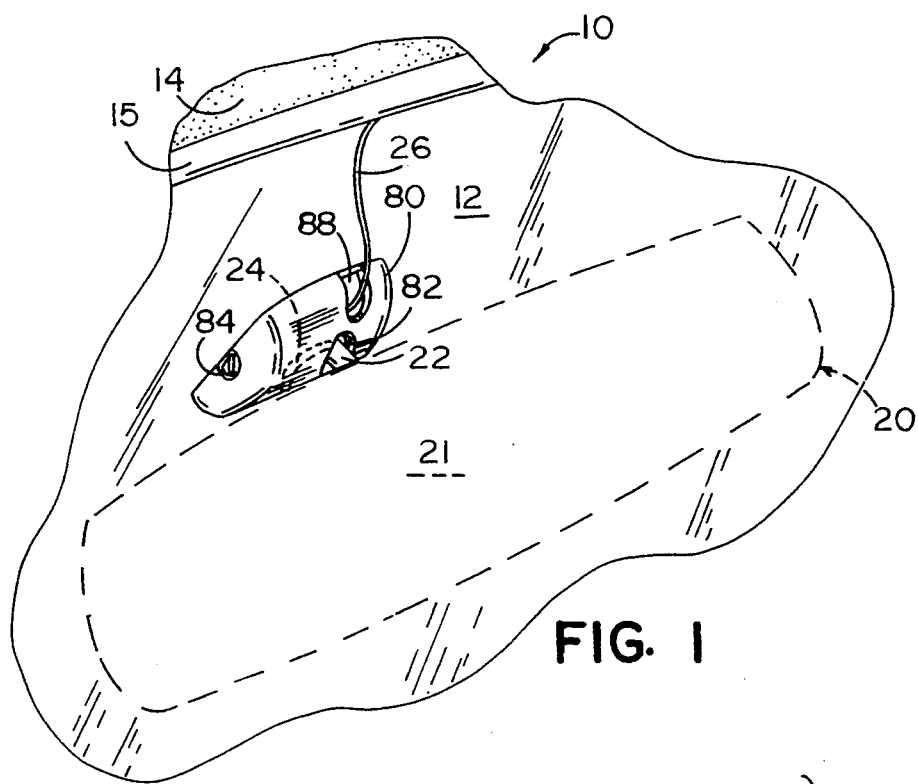
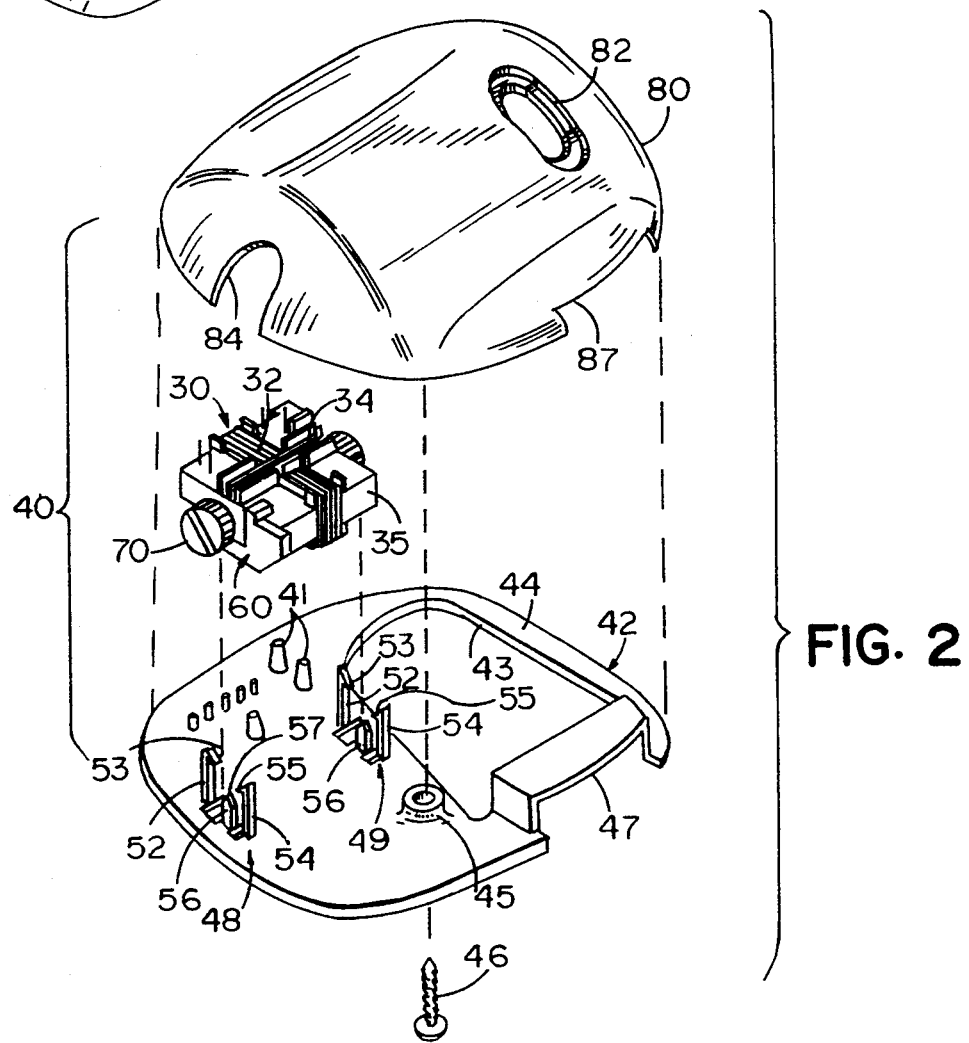

MAGNETIC SENSOR MOUNT

BACKGROUND OF THE INVENTION

The present invention relates to a mounting system for a magnetic sensor and particularly to an assembly for mounting a flux-gate sensor to the windshield of a vehicle such as an automobile.

In recent years, digital electronics technology has been used extensively in the automotive industry to provide, for example, a display of a variety of vehicle operating parameters including direction and temperature information. U.S. Pat. Nos. 4,505,054 and 425,717 relate specifically to vehicle electronic compasses and mounting systems for sensors which are employed to detect the earth's magnetic field to provide information to the electrical compass circuit which in turn provides a compass display to the vehicle operator. U.S. Pat. No. 4,953,305 discloses an example of an electronic compass commercially employed for providing a digital direction information display to a vehicle operation and one which employs a flux-gate sensor for providing such information.

It has been discovered that flux-gate sensors provide the most accurate information if mounted in a generally horizontal position in a vehicle and preferably in the upper windshield area. One method of mounting the flux-gate sensor in connection with the rearview mirror mounting system is disclosed in U.S. Pat. No. 4,425,717 in which the housing for the rearview mirror includes a flux-gate sensor embedded therein in a fixed position. Although this system works well for an individual vehicle, as can be appreciated, the angle of inclination of the windshield to which the rearview mirror mount is attached varies from vehicle to vehicle. U.S. Pat. No. 4,505,054 discloses a compass flux-gate sensor mounting system which is employed in connection with an overhead console for a vehicle whereby the flux-gate sensor is mounted on a rocker plate with tabs which adjust the position of the rocker plate in association with different vehicles to horizontally position the flux-gate sensor for installation in different vehicles. Although this provides for flexibility in mounting of the flux-gate sensor, it requires that each vehicle include a predetermined adjustment tab for positioning the flux-gate sensor in a horizontal position which requires expensive tooling of a unique part for each model vehicle.

SUMMARY OF THE PRESENT INVENTION

The system of the present invention provides, however, a magnetic sensor mounting system in which a sensor can be mounted in its preferred location near the upper windshield area of a vehicle and integrated into a rearview mirror mount and which is adjustable to allow use of the mounting system in any vehicle regardless of the angle of inclination of the windshield. Further, the system allows for easy retrofitting of vehicles with aftermarket electronic compasses. Additionally, the system of the present invention allows the compass sensor to be mounted directly to an existing rearview mirror mounting pad or button without alteration of the existing rearview mirror mounting system.

Systems embodying the present invention include a base plate having means for pivotally receiving and adjustably locking a sensor supporting platform thereto. The base plate includes means for attaching the plate to an existing rearview mirror mounting member. The assembly further includes a cover providing access for adjusting the platform to a horizontal position and for allowing the rearview mirror mounting stem to extend therethrough.

The resultant structure allows a magnetic sensor, such as a flux-gate sensor, to be easily mounted to a vehicle during original equipment manufacturing of the vehicle and adjusted for horizontally positioning the flux-gate sensor for maximum accuracy in detecting magnetic field information for subsequent processing by an electronic compass circuit. It also provides an assembly which can easily be retrofitted to existing vehicles. These and other features, objects and advantages of the present invention will become apparent upon reading the following description thereof together with reference to the accompanying drawings in which:

BRIEF DESCRIPTION OF THE DRAWINGS

FIG. 1 is a fragmentary, perspective view of a vehicle showing a rearview mirror and a magnetic field sensor mounting system embodying the present invention;

FIG. 2 is a greatly enlarged, exploded view of the mounting system of the present invention;

DETAILED DESCRIPTION OF THE PREFERRED EMBODIMENT

Figure 3:
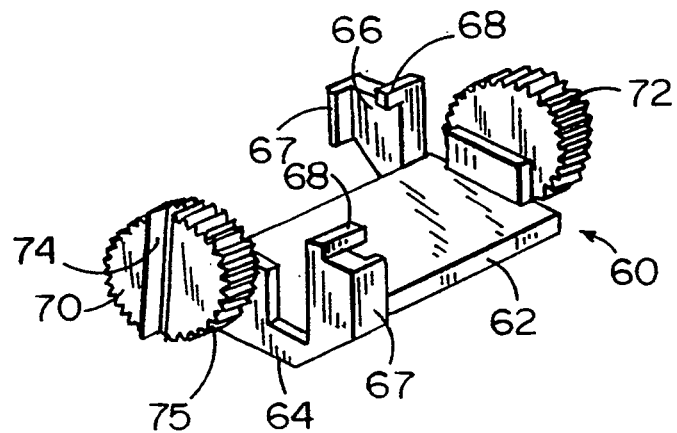
FIG. 3 is an enlarged perspective view of a portion of the structure shown in FIG. 2.

Referring initially to FIG. 1, there is shown a vehicle 10 such as an automobile and particularly the front windshield area showing the windshield 12 and the upper edge of the roof 14 of the vehicle which may include a trim molding 15. Mounted to the vehicle windshield 12 is a rearview mirror assembly 20 shown partially in phantom form in FIG. 1. The rearview mirror assembly 20 includes a rearview mirror 21 mounted in a suitable housing in a conventional manner. Assembly 20 includes a mounting stem 22 extending toward the windshield 12 and terminating in a mounting channel which engages a mounting button or pad 24 which typically is adhesively attached to the windshield 12 near the roof 14 of the vehicle. Rearview mirror assembly 20, thus described, can be of conventional construction or may include an electrical digital compass and display such as disclosed in U.S. patent application Ser. No. 567,390, filed Aug. 14, 1990 and entitled ELECTRICAL CONTROL SYSTEM FOR VEHICLE OPTIONS, the disclosure of which is incorporated herein by reference. The rearview mirror may include a digital display integrated into the mirror housing itself as well as the electrical circuitry for processing signals from a magnetic sensor such as a flux-gate sensor 30 (FIG. 2). In such case the sensor would be electrically coupled directly to the circuitry within the rearview mirror itself in such an embodiment. In the embodiment illustrated in FIG. 1, however, the signals from the flux-gate sensor 30 are supplied via conductors 26 to an electrical compass circuit and display which may be incorporated in an overhead console of the vehicle as disclosed, for example, in U.S. Pat. No. 4,953,305, the disclosure of which is incorporated herein by reference.

The compass sensor mounting system includes an assembly 40 having three major components including a base plate 42, a pivotally adjustable platform 60 and a cover 80 mounted to conceal the flux-gate sensor as illustrated in the installation shown in FIG. 1. The base plate 42 is generally flat having a slot 43 formed therein which allows the plate to fit over the rearview mirror mounting button 24 which is attached directly to the windshield. The upper surface 44 of plate 42 engages the lower edge of the channel mount attached to the stem 22 which fits in a dove-tail manner to the mounting button in a conventional manner. Plate 42 includes an aperture 45 for receiving a fastening screw 46 which extends therethrough and engages a mounting boss (not shown) on the inside of cover 80 to compressibly engage the channel mount member of the rearview mirror between the plate and cover. A generally U-shaped bridge 47 provides structural rigidity to the edge of plate 42 in the area of the relatively wide open mouth of slot 43 to maintain its structural integrity.

Figure 4:
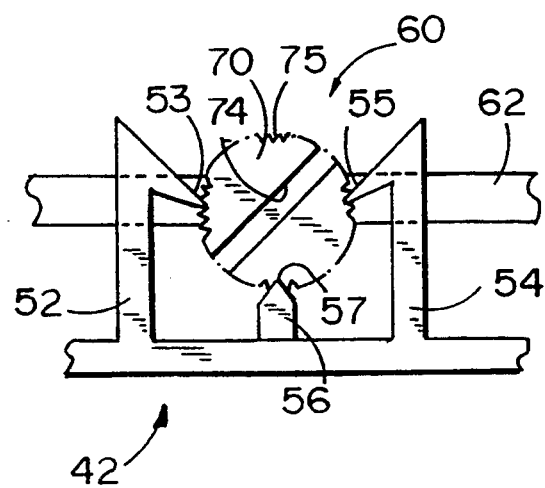
FIG. 4 is an enlarged fragmentary side-elevational view of the support platform and cradle portion of the system of the present invention.

The base plate 42 includes a pair of spaced mounting cradles 48 and 49 each extending upwardly from the surface 44 of the plate. Each of the cradles 48 and 49 include a first leg 52 having an inwardly and downwardly projecting tang 53 and a second leg 54 with a downwardly and inwardly projecting tang 55 with legs 52 and 54 being spaced to compressibly grip the serrated outer periphery of the adjustment means associated with platform 60 as best seen in FIG. 4. Positioned between the legs 52 and 54 and also extending upwardly from the surface 44 of base plate 42 is a pointed indexing leg 56 which engages the serrations of the platform adjustment means for holding the magnetic sensor held by the pivot rocker assembly in a horizontal position once adjusted. The leg 56 includes a pointed tip 57 for such purpose.

The platform 60 is best seen in the enlarged perspective view of FIG. 3 and includes a generally rectangular plate 62 with upstanding ends 64 and 66 defining a flux-gate receiving structure with inwardly turned ends 67 holding the generally rectilinear flux-gate sensor 30 in place as best seen in FIG. 2. The ends 64 and 66 also include an overlapping tang 68 for holding the flux-gate sensor in position. Member 60, like member 42, is made of a resilient polymeric material such as a polycarbonate, ABS or the like which allows the flux-gate sensor 30 to be snap-fitted within the socket defined by configured end walls 64 and 66. Integrally formed with the end walls 64 and 66 is pivot axle defining means comprising a pair of serrated discs 70 and 72 which include an adjustment slot 74 formed therein to allow the screwdriver adjustment of the platform 60 with respect to base plate 42. Thus, each of the adjustment and locking discs 70 and 72 include a plurality of circumferentially formed serrations 75.

As best seen in FIG. 4, the platform 60 snap fits downwardly between legs 52 and 54 of the receiving means or cradles 48 and 49 on base plate 42. The tangs 53 and 55 of the legs 52 and 54 respectively hold the platform 60 in position with locking member 56 extending centrally upwardly with pointed tip 57 inserted into one of the serrations 75 for holding the flux-gate sensor in a predetermined adjusted position. Thus, the platform is held between the pairs of cradle-defining legs 52 and 54 in spaced relationship above plate 42 and in an angular position which can be adjusted by the insertion of a screwdriver into slot 74 and rotating the platform to a desired adjusted position by which it is held by the tips 53 and 55 of legs 52 and 54 and the tip 57 of arm 56 with tangs 53, 55 and tip 57, respectively, extending into engagement with serrations 75 as seen in FIG. 4. This adjustment allows the flux-gate sensor 30, which includes orthogonal windings 32 and 34 wound on a rectangular core member 35, and held within the end walls 64 and 66 of rocker assembly, to be adjusted to lie in a substantially horizontal plane regardless of the angle of the windshield 12 of a vehicle in which the magnetic sensor is mounted.

The cover 80 extends over the flux-gate sensor base and engages the opposite side of the channel mount allowing the stem 22 to extend through a slot 82 formed in the cover as best seen in FIG. 1. The inner surface of the cover engages the top of the channel mount member and the base plate 42 engages the opposite surface to thereby sandwich and secure the assembly 40 to the channel mount of the rearview mirror housing 20 prior to its attachment to the rearview mirror mounting button 24. The domed-shaped cover 80 also includes a slot 84 which aligns with the adjustment disc 70 of the platform 60 to allow the insertion of a small flat-bladed screwdriver therein for the adjustment of the flux-gate sensor to a horizontal position. The cover 80 also includes a rectangular notch 87 corresponding to the slot 43 in base plate 42. An additional slot 88 is provided to allow clearance for the conductors 26 to extend from the enclosed flux-gate sensor mount as seen in FIG. 1. For purposes of indexing the cover to the base plate, the base plate may include a plurality of upstanding tapered posts 41 as seen in FIG. 2 which extend within correspondingly shaped receiving bosses (not shown) on the inside of the generally concaved cover 80. With the system of the present invention, the platform 60 can be formed with discs 70 and 72 and slot 74 formed in disc 70 such that for any given vehicle, the slot 74 will be vertical as viewed when the magnetic field sensor mount is installed in a vehicle to align the flux-gate sensor 30 in a horizontal plane for providing a quick reference to the manufacturer that the adjustment is substantially correct. Slight adjustments may be made as desired with the system of the present invention which allows the lockable readjustment of the flux-gate sensor by the insertion of a screwdriver through cover slot 84 and into slot 74 to rotate the platform 60 with the flux-gate sensor thereon to the desired horizontal position.

Thus, with the system of the present invention, a relatively inexpensive mounting system is provided for adding a magnetic field sensor such as a flux-gate sensor to an existing vehicle structure and allow for the adjustment of the magnetic field sensor to a horizontal position. It will become apparent to those skilled in the art that various modifications to the preferred embodiment of the present invention can be made without departing from the spirit or scope of the invention as defined by the appended claims.

The embodiments of the invention in which an exclusive property or privilege is claimed are defined as follows:

1. A sensor mount for mounting a magnetic field sensor to a vehicle, said mount comprising:
   a base including a cradle means for receiving a sensor platform therein, said cradle means including means for lockably engaging the platform in a selectively adjustable position;
   a platform including means for attaching a magnetic field sensor thereto, said platform further including a pivot axle for pivotably mounting said platform to said cradle means for holding said platform and sensor thereon in an adjusted angular position;

wherein said pivot axle includes a plurality of serrations and said means for lockably engaging said platform includes at least one resilient leg having a tang for engaging said serrations of said pivot axle; and a cover enclosing said platform.

2. The sensor mount as defined in claim 1 wherein said cradle means comprises a pair of spaced cradles wherein said cradles each include a pair of spaced legs extending upwardly from said base and each of said legs include an inwardly projecting tang at an end remote from said base for engaging said serrations.

3. A sensor mount for mounting a magnetic field sensor to a vehicle, said mount comprising:
   a base including a pair of spaced cradles for receiving a sensor platform therein, said cradles including means for lockably engaging the platform;
   a platform including means for attaching a magnetic field sensor thereto, said platform further including mounting and adjustment means for engaging said cradles for holding said platform and sensor thereon in an adjusted angular position; wherein said cradles each include a pair of spaced legs extending upwardly from said base and each of said legs include an inwardly projecting tang at an end remote from said base for engaging said mounting and adjustment means of said platform; and wherein said means for lockably engaging said platform of each of said cradles further includes an intermediate leg extending from said base between said pair of spaced legs for engaging said mounting and adjustment means of said platform; and
   a cover enclosing said platform and secured to said base.

4. The sensor mount as defined in claim 3 wherein said intermediate leg includes a pointed tip for engaging said mounting and adjustment means of said platform.

5. The sensor mount as defined in claim 4 wherein said platform comprises a plate and said mounting and adjustment means of said platform includes at least one disc mounted to said plate and including a serrated outer periphery for engaging said tip of said intermediate leg to hold said platform in an angularly adjusted position.

6. The sensor mount as defined in claim 5 wherein said platform includes a pair of spaced discs with each one of said discs engaging an associated cradle.

7. The sensor mount as defined in claim 6 wherein said at least one disc includes slot means formed on an outwardly facing surface for adjusting said platform.

8. An assembly for mounting a magnetic field sensor to a vehicle windshield comprising:
   a sensor platform including a means defining a pivotable mounting axle, said means including at least one disc-shaped member having serrations on the outer periphery thereof, said platform further including means for holding a magnetic field sensor thereon; and
   means for mounting said platform to a vehicle windshield, said mounting means including cradle means for receiving and holding said means defining a mounting axle, and wherein said cradle means includes an element which engages one of said serrations for holding said platform in an adjusted position within said cradle means.

9. The assembly as defined in claim 8 wherein said means for mounting said platform comprises a base and wherein said cradle means comprises a pair of spaced cradles each including a pair of spaced legs extending upwardly from said base and each of said legs include an inwardly projecting tang at an end remote from said base for engaging said serrations of said disc-shaped member for holding said platform within said cradle means.

10. The assembly as defined in claim 9 wherein said platform includes a plate and said means defining said axle comprises a pair of disc-shaped members integrally formed on opposite sides of said plate.

11. The assembly as defined in claim 10 wherein said means for holding a magnetic field sensor includes arm means extending from said plate to engage a magnetic field sensor.

12. The assembly as defined in claim 11 wherein said base is made of a resilient polymeric material to allow said platform to snap-fit within said cradle means.

13. The assembly as defined in claim 12 wherein said cradles each further includes an intermediate leg extending from said base between said pair of spaced legs for also engaging a serration of said disc-shaped member for holding said platform in an adjusted position.

14. The assembly as defined in claim 13 wherein said intermediate leg includes a pointed tip.

15. The assembly as defined in claim 14 and further including a cover engaging said base and enclosing said platform.

16. An assembly for mounting a magnetic field sensor to a vehicle windshield comprising:
   a sensor platform including a means defining a pivotable mounting axle, said axle including serrations on the outer periphery thereof, said platform further including means for holding a magnetic field sensor thereon; and
   means for mounting said platform to a vehicle windshield, said mounting means including cradle means for receiving and holding said means defining a mounting axle, and wherein said cradle means includes means for engaging at least one of said serrations for holding said platform in an adjusted position within said cradle means.

17. The assembly as defined in claim 16 wherein said means for mounting said platform comprises a base and wherein said cradle means comprises a pair of spaced cradles each including a pair of spaced legs extending upwardly from said base and each of said legs include an inwardly projecting tang at an end remote from said base for engaging said serrations of said axle for holding said platform within said cradle means.

18. The assembly as defined in claim 17 wherein said platform includes a plate and said axle comprises a pair of disc-shaped members integrally formed on opposite sides of said plate.

19. The assembly as defined in claim 18 wherein said means for holding a magnetic field sensor includes arm means extending from said plate to engage a magnetic field sensor.

20. The assembly as defined in claim 19 wherein said base is made of a resilient polymeric material to allow said platform to snap-fit within said cradle means.

21. The assembly as defined in claim 22 wherein said cradles each further includes an intermediate leg extending from said base between said pair of spaced legs for also engaging a serration of said disc-shaped member for holding said platform in an adjusted position.

22. The assembly as defined in claim 21 wherein said intermediate leg includes a pointed tip.

23. The assembly as defined in claim 22 and further including a cover engaging said base and enclosing said platform.

* * * * *

UNITED STATES PATENT AND TRADEMARK OFFICE
CERTIFICATE OF CORRECTION

PATENT NO.   : 5,339,529
DATED        : August 23, 1994
INVENTOR(S)  : Kenneth M. Lindberg It is certified that error appears in the above-identified patent and that said Letters Patent is hereby corrected as shown below:

Column 1, Line 13;

"425,717" should be –4,425,717–.

* Column 6, Claim 21, Line 58;

"22" should be –20–.

Signed and Sealed this

Second Day of May, 1995

Attest:

BRUCE LEHMAN

Attesting Officer          Commissioner of Patents and Trademarks